US012742033B2

(12) United States Patent
Heitz et al.

(10) Patent No.: US 12,742,033 B2
(45) Date of Patent: Sep. 22, 2026

(54) METHOD FOR THE PRODUCTION OF STABLE POLYOXYMETHYLENE COPOLYMERS (cPOM)

(71) Applicants: BASF SE, Ludwigshafen am Rhein (DE); Kolon Plastics Inc., Gwacheon-Si (KR)

(72) Inventors: Thomas Heitz, Ludwigshafen am Rhein (DE); Juergen Demeter, Ludwigshafen am Rhein (DE); Anna Karina Moeller, Ludwigshafen am Rhein (DE); Cho In-Gi, Gimheon City (KR)

(73) Assignee: BASF SE, Ludwigshafen am Rhein (DE)

( * ) Notice: Subject to any disclaimer, the term of this patent is extended or adjusted under 35 U.S.C. 154(b) by 1214 days.

(21) Appl. No.: 17/260,151

(22) PCT Filed: Jul. 10, 2019

(86) PCT No.: PCT/EP2019/068579

§ 371 (c)(1),
(2) Date: Jan. 13, 2021

(87) PCT Pub. No.: WO2020/011873

PCT Pub. Date: Jan. 16, 2020

(65) Prior Publication Data

US 2021/0292461 A1 Sep. 23, 2021

(30) Foreign Application Priority Data

Jul. 13, 2018 (EP) .................................... 18183318

(51) Int. Cl.

| | |
|---|---|
| ***C08G 2/28*** | (2006.01) |
| ***B01J 31/14*** | (2006.01) |
| ***C08G 2/06*** | (2006.01) |
| ***C08G 2/10*** | (2006.01) |
| ***C08L 59/04*** | (2006.01) |

(52) U.S. Cl.

CPC .............. *C08G 2/28* (2013.01); *B01J 31/146* (2013.01); *C08G 2/06* (2013.01); *C08G 2/10* (2013.01); *C08L 59/04* (2013.01)

(58) Field of Classification Search

CPC ............ B01J 31/146; C08G 2/28; C08G 2/06; C08G 2/10; C08L 59/00; C08L 59/02; C08L 59/04

See application file for complete search history.

(56) References Cited

U.S. PATENT DOCUMENTS

| | | | |
|---|---|---|---|
| 4,436,900 | A | 3/1984 | Matsuzaki et al. |
| 5,144,005 | A | 9/1992 | Sextro et al. |
| 7,893,140 | B2 | 2/2011 | Hase |

FOREIGN PATENT DOCUMENTS

| | | | | |
|---|---|---|---|---|
| DE | 3703790 | A1 | 8/1988 | |
| DE | 19633708 | A1 | 2/1997 | |
| EP | 0244245 | A2 | 11/1987 | |
| EP | 1688461 | A1 | 8/2006 | |
| WO | 93/22359 | A1 | 11/1993 | |
| WO | WO-2019215266 | A1 * | 11/2019 | ............ C08G 65/16 |

OTHER PUBLICATIONS

International Preliminary Report on Patentability received for PCT Patent Application No. PCT/EP2019/068579, mailed on Jan. 28, 2021, 8 pages.

International Search Report and Written Opinion received for PCT Patent Application No. PCT/EP2019/068579, mailed on Oct. 16, 2019, 9 pages.

* cited by examiner

*Primary Examiner* — Jeffrey S Lenihan

(74) *Attorney, Agent, or Firm* — Faegre Drinker Biddle & Reath LLP

(57) ABSTRACT

The present invention relates to a method for the deactivation of an acid catalyst during the production process of a polyoxymethylene copolymer (cPOM) by adding triisopropanolamine (tris(2-hydroxypropyl)amine) to a mixture which comprises the polyoxymethylene copolymer (cPOM) and the acid catalyst.

9 Claims, No Drawings

METHOD FOR THE PRODUCTION OF STABLE POLYOXYMETHYLENE COPOLYMERS (cPOM)

CROSS-REFERENCE TO RELATED APPLICATIONS

This application is a national stage application (under 35 U.S.C. § 371) of PCT/EP2019/068579, filed Jul. 10, 2019, which claims benefit of European Application No. 18183318.7, filed Jul. 13, 2018, both of which are incorporated herein by reference in their entirety.

The present invention relates to a method for the deactivation of an acid catalyst during the production process of a polyoxymethylene copolymer (cPOM) by adding triisopropanolamine (tris(2-hydroxypropyl)amine) to a mixture which comprises the polyoxymethylene copolymer (cPOM) and the acid catalyst.

In addition, the present invention relates to the use of triisopropanolamine for the deactivation of an acid catalyst during the production of a polyoxymethylene copolymer (cPOM).

Moreover, the present invention relates to a method for the production of a polymer molding composition (PM) which comprises a polyoxymethylene copolymer (cPOM), the polymer molding composition (PM) obtained by the production method and the use of the polymer molding composition (PM) for the production of molded parts.

Polyoxymethylene copolymers are known for a long time. The polymers have a number of outstanding properties so that they are suitable for a wide variety of industrial applications. Polyoxymethylene copolymers are engineering thermoplastics and are used in various applications of transportation, electrics, electronics and consumer industries. Polyoxymethylene copolymers are also known as acetal resins, polyacetals and polyformaldehydes. For the production of polyoxymethylene copolymers, formaldehyde is generally converted to its cyclic oligomer, preferably to 1,3,5-trioxane. Polyoxymethylene copolymers can be obtained by the polymerization of the cyclic oligomers of formaldehyde, preferably 1,3,5-trioxane, and the comonomer/s in the presence of an acid catalyst. The polymerization can be carried out as a bulk polymerization, for example in a melt kneader. After the polymerization reaction, raw polyoxymethylene copolymer is obtained which still contains the acid catalyst. If the acid catalyst remains in the polyoxymethylene copolymer, it can catalyze the depolymerization reaction of the polyoxymethylene copolymer to formaldehyde which leads to an unstable polyoxymethylene copolymer with very limited usability.

Therefore, after the polymerization, the acid catalyst typically is deactivated and the raw polyoxymethylene copolymer is typically further stabilized by the removal of residual monomers and the removal of unstable end groups in order to obtain the finished polyoxymethylene copolymer.

For the deactivation of the acid catalyst contained in the raw polyoxymethylene copolymer, normally a deactivation agent is added to the raw polyoxymethylene copolymer. As a deactivation agent, generally a basic compound is used. The basic compound which is used as a deactivation agent generally forms an acid-base product, in other words, a complex of the acid catalyst and the basic compound that remains in the polymer matrix of the polyoxymethylene copolymer.

The German patent application DE 3 703 790 discloses a method for the production of polyoxymethylene copolymers, wherein the acid catalyst is deactivated with triethylamine, triethanolamine or tri-n-butylamine.

The European patent application EP 1 688 461 also discloses a process for the production of polyoxymethylene copolymers, wherein the acid catalyst is deactivated by the addition of an amine, namely triethylamine.

The European patent application EP 0 244 245 discloses a process for the production of a polyoxymethylene copolymer, wherein hindered heterocyclic amines are used for the deactivation of the acid catalyst.

The German patent application DE 196 33 708 discloses a method for the production of polyoxymethylene copolymers, wherein the acid catalyst is deactivated with ammonia, trimethylamine, dimethylamine or triethylamine.

The US patent U.S. Pat. No. 7,893,140 discloses a method for the production of polyoxymethylene copolymers, wherein the acid catalyst is deactivated with triethylamine, tributylamine, triethanolamine or tributanolamine.

The international patent application WO 93/22359 discloses a process for producing a polyoxymethylene copolymer by copolymerizing trioxane as a main monomer with a cyclic ether or a cyclic formal as a comonomer by using a cationically active catalyst, wherein an alkali metal fluoride is contacted with the copolymer after the completion of the copolymerization to thereby deactivate the polymerization catalyst.

The methods for the production of polyoxymethylene copolymers and the deactivation agents used in the state of the art, however, lead to finished polyoxymethylene copolymers which in some cases show insufficient stability. Moreover, in some cases, the polyoxymethylene copolymers obtained by the production methods described in the state of the art show formaldehyde emissions which are too high and, therefore, the finished polyoxymethylene copolymers cannot be used in food or drinking water applications. In some cases, the polyoxymethylene copolymers obtained by the methods described in the state of the art, moreover, show a migration of the deactivation agent so that these polyoxymethylene copolymers also cannot be used for food contact or drinking water applications.

The object underlying the present invention is, therefore, to provide a method for the deactivation of an acid catalyst during the production process of polyoxymethylene copolymers, which leads to polyoxymethylene copolymers which do not have the above-mentioned disadvantages of the prior art or only to a significantly reduced extent. In particular, the method should lead to polyoxymethylene copolymers showing an improved thermal and hydrolytic stability, lower formaldehyde emissions and good color values as well as good mechanical properties, being appropriate for food contact or drinking water applications at the same time.

This object is solved by the method for the deactivation of an acid catalyst during the production process of a polyoxymethylene copolymer (cPOM), wherein the method for the deactivation of the acid catalyst comprises the steps:

a) providing a first mixture (M1) comprising the polyoxymethylene copolymer (cPOM) and the acid catalyst,
b) adding triisopropanolamine to the first mixture (M1) to deactivate the acid catalyst in order to obtain a second mixture (M2) comprising the polyoxymethylene copolymer (cPOM) and a complex of the acid catalyst and triisopropanolamine.

Another object of the present invention is the polymer molding composition (PM) obtained by the method according to claim 9.

It has surprisingly been found that if in a method for the production of a polyoxymethylene copolymer (cPOM) triisopropanolamine is used to deactivate the acid catalyst, the properties of the polyoxymethylene copolymers (cPOM) are improved. The polyoxymethylene copolymers (cPOM) show an improved thermal and hydrolytic stability, lower formaldehyde emissions and good color values as well as good mechanical properties.

Moreover, it has surprisingly been found that the complex of the acid catalyst and the triisopropanolamine which remains in the finished polyoxymethylene copolymer (cPOM) is stable and, therefore, the finished polyoxymethylene copolymer (cPOM) is thermally stable, hydrolytically stable, shows low formaldehyde emission and low migration of the deactivation agent and, therefore, is especially suitable for applications demanding contact to food or drinking water.

First Mixture (M1)

In step a), a first mixture (M1) is provided, comprising the polyoxymethylene copolymer (cPOM) and the acid catalyst.

Polyoxymethylene copolymers (cPOMs) are known per se. They are preferably prepared by polymerization of trioxane (as a monomer) and one or more comonomers.

In general, the polyoxymethylene copolymer (cPOM) contained in the first mixture (M1) comprises from 60 to 99.99 mol-% of —$CH_2O$— recurring units and from 0.01 to 40 mol-% of recurring units according to formula (I)

(I)

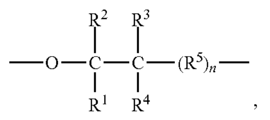

, where $R^1$ to $R^4$ are each, independently of one another, a hydrogen atom, a $C_1$-$C_4$-alkyl group or a alkoxy-substituted alkyl group having from 1 to 4 carbon atoms, and $R^5$ is a chemical bond, a —$CH_2$—, —$OCH_2$—, a $C_1$-$C_4$-alkyl- or $C_1$-$C_4$-alkoxy-substituted methylene group or a corresponding oxymethylene group, and n is from 0 to 3, wherein the mol-% of the —$CH_2O$— recurring units and the mol-% of the recurring units according to formula (I) are based on the total number of mols of recurring units contained in the polyoxymethylene copolymer (cPOM).

Preferably, the polyoxymethylene copolymer (cPOM) comprises 60 to 99.99 mol-%, more preferably 80 to 99.95 mol-%, even more preferably 90 to 99.9 mol-% and particularly preferred 94 to 99.5 mol-% of —$CH_2O$— recurring units. Preferably, the polyoxymethylene copolymer (cPOM) comprises 0.01 to 40 mol-%, more preferably 0.05 to 20 mol-%, even more preferably 0.1 to 10 mol-%, and particularly preferred 0.5 to 6 mol-% of recurring units according to formula (I), wherein the mol-% in each case are based on the total number of mols of recurring units comprised in the polyoxymethylene copolymer (cPOM).

Therefore, another object of the present invention is a method, wherein the polyoxymethylene copolymer (cPOM) comprises from 60 to 99.99 mol % of —$CH_2O$— recurring units and from 0.01 to 40 mol % of recurring units according to formula (I)

(I)

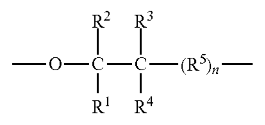

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a chemical bond, a —$CH_2$—, —$OCH_2$—, a $C_1$-$C_4$-alkyl- or $C_1$-$C_4$-alkoxy-substituted methylene group or a corresponding oxymethylene group and n is from 0 to 3.

The —$CH_2O$— recurring units are generally introduced into the polyoxymethylene copolymer (cPOM) by a polymerization of at least one main monomer selected from the group of cyclic formals (cyclic oligomers of formaldehyde), wherein 1,3,5-trioxane is particularly preferred.

The recurring units according to formula (I) can advantageously be introduced into the polyoxymethylene copolymer (cPOM) by ring-opening polymerization of at least one first comonomer selected from the group of those of the formula (II)

(II)

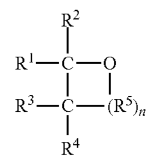

where $R^1$ to $R^5$ and n are as defined above for formula (I).

Preferably, the at least one first comonomer is selected from the group consisting of ethylene oxide, 1,2-propylene oxide, 1,2-butylene oxide, 1,3-butylene oxide, 1,3-dioxane, 1,3-dioxolane and 1,3-dioxepane, wherein 1,3-dioxolane is particularly preferred.

Optionally, the polyoxymethylene copolymer (cPOM) can comprise recurring units derived from at least one second comonomer. The second comonomer is preferably selected from the group consisting of cyclic ethers of the formula (III), or of acetals of the formula (IV)

(III)

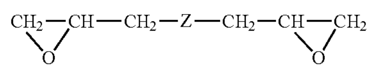

(IV)

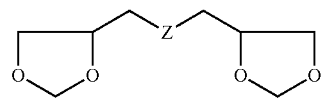

where Z is a chemical bond, —O—, —ORO— (R is $C_1$-$C_8$-alkylene or $C_3$-$C_8$-cycloalkylene), linear oligoformals and polyformals. Preferred second comonomers are selected from the group consisting of ethylene diglycide, diglycidyl ether and diethers derived from glycidyls and formaldehyde, dioxane or trioxane in a molar ratio of 2:1 and also diethers derived from 2 mol of a glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol, 1,3-propanediol, cyclohexane-1,4-diol.

If at least one second monomer is used, the at least second monomer is preferably used in such amounts that the recurring units derived therefrom are contained in the polyoxymethylene copolymer (cPOM) in amounts of 0.001 to 5%, preferably from 0.01 to 2%, wherein the mol-% in each case are based on the total number of mols of recurring units comprised in the polyoxymethylene copolymer-(cPOM).

The molecular weight of the cPOM is adapted to the needed melt viscosity of the resulting product by the use of at least one chain transfer agent (CTA). As CTA, linear oligoformals like dimethoxymethane, diethoxymethane or dibutoxymethane can be used. Dimethoxymethane ($CH_3OCH_2OCH_3$) is the preferred CTA.

The melting point of the polyoxymethylene copolymer (cPOM) contained in the first mixture (M1) is preferably in the range of from 150 to 200° C., more preferably the melting point is in the range of from 160 to 180° C. The melting point of the cPOM is determined with a heating and cooling rate of 20 K/Min according to DIN EN ISO 11357-3 (year 2013-04) and a sample weight of about 8.5 mg.

The molecular weight of the polyoxymethylene copolymer (cPOM) contained in the first mixture (M1) (weight-average Mw; determined as described below) can be adjusted within a wide range. The molecular weight $M_w$ is preferably in the range of from 10 000 to 240 000 g/mol±10%, while the number-average molecular weight $M_n$ (determined as described below) is preferably in the range of from 8 000 to 85 000 g/mol. Preferably, the polyoxymethylene copolymer (cPOM) contained in the first mixture (M1) has a molecular weight (Mw) in the range of from 80 000 to 220 000 g/mol±10%, while its molecular weight ($M_n$) is preferably in the range of from 9 000 to 38 000 g/mol. The Mw/Mn ratio (Polydispersity Index) of the polyoxymethylene copolymer (cPOM) contained in the first mixture (M1) is preferably in the range of from 1.4 to 14, the Mw/Mn is more preferably in the range of from 2.1 to 14.

The molecular weight of the polymers and the cPOM was determined via size-exclusion chromatography in a SEC apparatus (size exclusion chromatography). This SEC apparatus was composed of the following combination of separating columns: a preliminary column of length 5 cm and diameter 8 mm, a second linear column of length 30 cm and diameter 7.5 mm. The separating material in both columns was PL-HFIP gel from Polymer Laboratories. The detector used comprised a differential refractometer from Agilent 1100. A mixture composed of hexafluoro isopropanol with 0.05% of potassium trifluoro acetate was used as eluent. The flow rate was 1 ml/min, the column temperature being 35° C. 60 microliters of a solution at a concentration of 1.5 g of specimen per liter of eluent were injected. This specimen solution had been filtered in advance through Millipor Millex FG (pore width 0.2 micrometers). Narrowly distributed PMMA standards from PSS (Mainz, DE) with molecular weight M from 800 to 2.220.000 g/mol were used for calibration. Polydispersity index is defined as the weight average molecular weight divided by the number average molecular weight.

The molecular weight distribution of the polyoxymethylene copolymer (cPOM) contained in the first mixture (M1) may be monomodal or essentially monomodal. It may also have a multimodal molecular weight distribution. It may be possible that cPOM has a bimodal molecular weight distribution.

In step a), the first mixture (M1) is provided which comprises the polyoxymethylene copolymer (cPOM) and the acid catalyst. The term "acid catalyst" in the present invention is understood to mean exactly one acid catalyst and also mixtures of two or more acid catalysts. Preferably, the first mixture (M1) comprises one acid catalyst. The term "acid catalyst" in the present invention, moreover, is understood to comprise the acid catalyst itself as well as catalytic active transformation products of the acid catalyst.

The acid catalyst may preferably be at least one, e.g. two, more preferred one halide of boron, tin, titanium, phosphorous, antimony or arsenic. Thereby it may be preferred that the halide is a chloride or fluoride or that the halide contains both. Examples thereof are boron trifluoride, tin tetrachloride, titanium tetrachloride, phosphorus pentafluoride, phosphorous pentachloride, antimony pentaflouride and arsenic pentafluoride, and especially also their complex compounds.

The acid catalyst may preferably be at least one halide of boron, in particular boron trifluoride, e.g. boron trifluoro hydrate, or at least one, more preferred one coordination compound of boron halide and at least one, more preferred one organic compound comprising at least one oxygen or sulfur atom or both. Thereby it may be more preferred that the organic compound comprises only at least one, in particular one oxygen atom. Said organic compound to form a coordination compound of boron halide may for instance be an alcohol, ether or sulfide.

Preferably the acid catalyst is selected form the group consisting of boron halide in coordination with an ether, in particular an alkyl ether, such as a C1 to C4 alkyl ether may be most preferred. The coordination compound of boron trifluoride with an ether, in particular a dialkyl ether, such as a C1 to C4 dialkyl ether, may be most preferred, in particular inter alia, boron trifluoride dibutyl etherate, boron trifluoride diethyl etherate or boron trifluoride dimethyl etherate or a mixture thereof. Boron trifluoride diethyletherate may most preferably be used.

Another object of the present invention, therefore, is a method, wherein the acid catalyst is at least one acid catalyst selected from the group consisting of boron trifluoride, a coordination complex of boron trifluoride with water, a coordination complex of boron trifluoride with a dialkylether and catalytic active transformation product of the aforementioned acid catalysts.

In a particularly preferred embodiment, the first mixture (M1) comprises boron trifluoride diethyletherate as an acid catalyst.

The amount of the acid catalyst in the first mixture (M1) is not specifically limited. Typically, the amount of the acid catalyst in the first mixture (M1) is from 10 to 150 ppm, preferably from 20 to 140 ppm, more preferably from 30 to 130 ppm, and in particular preferred from 40 to 100 ppm, in each case based on the total weight of the main monomers and comonomers, preferably based on the total weight of the first mixture. Lower amounts may lead to slower reaction initiation, and higher amounts usually do not lead to a faster reaction.

In a preferred embodiment, the provision of the first mixture (M1) in step a) comprises step a1), namely the polymerization of at least one main monomer selected from the group of cyclic formals, preferably 1,3,5-trioxane, and at least one first comonomer selected from the group of those of formula (II) and, optionally, at least one second comonomer in presence of the acid catalyst.

Another object of the present invention, therefore, is a method, wherein step a) comprises the step:

a1) polymerization of at least one main monomer selected form the group of cyclic formals, and at least one first comonomer selected from the group of those of the formula (II)

(II)

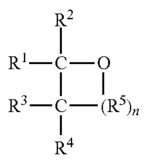

where $R^1$ to $R^5$ and n are as defined above in claim 2, and optionally at least one second comonomer, in the presence of the acid catalyst, in order to provide the first mixture (M1) comprising the polyoxymethylene copolymer (cPOM) and the acid catalyst.

Generally, the polymerization in step a1) can be carried out using diverse methods. Such methods are known to the person skilled in the art or are accessible to him by application of his general knowledge. It is preferred that the first mixture (M1) is produced via cationic polymerization. During cationic polymerization, cPOM can be formed in bulk (i.e. without or essentially without solvent).

The polymerization may be carried out at temperatures, pressures and in equipment generally known to the person skilled in the art or accessible to him by application of his general knowledge. For instance, it may be performed in an extruder or a cascade of two or more extruders such as of twin-screw type, such as of the self-cleaning type. It may also be possible to carry out the process disclosed herein in a kneader or a cascade of two or more kneaders, such as of the self-cleaning type. Generally, it may be advantageous to carry out the polymerization at temperatures as low as possible in order to avoid waste of energy and at temperatures high enough to sustain the polymerization and to ensure good blending, in particular by way of sustaining the at least one monomer and, if present, also the at least one comonomer in the liquid state. Thus, it may be preferred to carry out the polymerization at a temperature of from 50 to 150° C., whereby temperatures of from 60 to 120° C. may be more preferred. Thereby the temperatures refer to the temperature in the bulk.

In one embodiment, the first mixture (M1) can further contain unreacted residual monomers in amounts from 2 to 30% by weight. The unreacted residual monomers are typically selected from the above-mentioned main monomers, the comonomers and formaldehyde.

In a preferred embodiment, the first mixture (M1) comprises 70 to 98% by weight of polyoxymethylene copolymer (cPOM), 2 to 30% by weight of unreacted residual monomers, and 10 to 150 ppm acid catalyst, based on the total weight of the first mixture.

According to step b), triisopropanolamine is added to the first mixture (M1) in order to deactivate the acid catalyst and in order to obtain a second mixture (M2) comprising the polyoxymethylene copolymer (cPOM), a complex of the acid catalyst and triisopropanolamine.

Triisopropanolamine (tris(2-hydroxypropyl)amine; TIPOA) has the CAS-number 122-20-3. Its molar mass is 191.27 g/mol, its melting point is 45° C. and its boiling point is 301° C. Triisopropanolamine is water-soluble.

In step b), the triisopropanolamine can be added in pure form or in form of a solution which comprises the triisopropanolamine and an organic solvent. Preferably, the triisopropanolamine in step b) is added to the first mixture in form of a solution which comprises the triisopropanolamine and an organic solvent. Suitable organic solvents are for example cyclohexane, methanol, ethanol, acetone, methylethylketone, ethyl acetate or benzene, wherein benzene and ethyl acetate are preferred. Ethyl acetate is most preferred.

If the triisopropanolamine is added in form of a solution, the concentration of the triisopropanolamine is typically in the range of 1 to 50% by weight, preferably in the range of 5 to 60% by weight, more preferably in the range of 2 to 30% by weight, and particularly preferred in the range of 3 to 10% by weight, based on the total weight of the solution which comprises the triisopropanolamine and the organic solvent.

Moreover, in step b), in another embodiment, the triisopropanolamine may be added in a mixture with at least one other deactivation agent selected from the group consisting of ammonia, triethylamine, tri-n-butylamine and triethanolamine. However, in a preferred embodiment, in step b) triisopropanolamine is the only deactivation agent added.

In step b), preferably the triisopropanolamine is added in a molar excess in view of the acid catalyst contained in the first mixture (M1) from 25:1 to 1:1, more preferably from 10:1 to 1.1:1 and particularly preferred from 5:1 to 1.2:1.

In step b), a second mixture (M2) is obtained, comprising the polyoxymethylene copolymer (cPOM) and the complex of the acid catalyst and triisopropanolamine.

For the polyoxymethylene copolymer (cPOM) and the further optionally contained components like, for example, the unreacted residual monomers, the aforementioned descriptions and preferences apply analogously.

Another object of the present invention is the use of triisopropanolamine for the deactivation of an acid catalyst during the production of a polyoxymethylene copolymer.

Preferably, the triisopropanolamine is used after the polymerization step in the production of polyoxymethylene copolymers.

Another object of the present invention is a method for the production of a polymer molding composition (PM) comprising the steps:

a1) polymerization of at least one main monomer selected form the group of cyclic formals, and at least one first comonomer selected from the group of those of the formula (II)

(II)

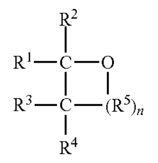

where $R^1$ to $R^5$ and n are as defined above in claim 2, and optionally at least one second comonomer, in the presence of the acid catalyst, in order to provide the first mixture (M1) comprising the polyoxymethylene copolymer (cPOM) and the acid catalyst, b) adding triisopropanolamine to the first mixture (M1) to deactivate the acid catalyst in order to obtain a second mixture (M2) comprising the polyoxymethylene copolymer (cPOM) and a complex of the acid catalyst and triisopropanolamine, c) optionally adding at least one additive to the second mixture (M2).

For steps a1) and b) of the method for the production of the polymer molding composition (PM) the aforementioned descriptions and preferences in view of the method for the deactivation of an acid catalyst during the production process of a polyoxymethylene copolymer (cPOM) apply analogously.

In step c), optionally at least one additive is added to the second mixture (M2). However, in a preferred embodiment, the second mixture (M2) contains, as described above, 2 to 30% by weight of unreacted residual monomers and 50 to 700 ppm of the complex of the catalyst and the triisopropanolamine. The polyoxymethylene copolymer, moreover, may contain unstable end groups. In a preferred embodiment, therefore, the second mixture (M2) is thermally treated in order to remove the residual monomers and to depolymerize the unstable end groups. The removal of the residual monomers and the unstable end groups is usually done in the melt using a kneading and a degassing device. This finishing process is generally known to a person skilled in the art.

To the thus obtained finished polyoxymethylene copolymer (cPOM) optionally at least one additive may be added.

The at least one additive can be added in any known device. The additives are preferably added in a mixing device.

Suitable antioxidants are for example sterically hindered phenols, such as triethylene glycol bis(3-tert-butyl-4-hydroxy-5-methylphenyl)propionate, for example Irganox 245 of BASF SE. In case an antioxidant is used, it is added in such an amount that the polyoxymethylene copolymer (cPOM) comprises from 0.001 to 10% by weight, preferably from 0.002 to 5% by weight, more preferred from 0.005 to 3% by weight antioxidant(s) based on the total weight of polyoxymethylene copolymer (cPOM).

Suitable formaldehyde scavengers are for example amines, amino-triazine compounds, benzoguanamine, amino-acids, hydrazides, urea or urea derivatives, allantoin, guanamines, hydantoin, (modified) melamines or condensates of melamine and formaldehyde and polyamides, or mixtures thereof. In case a formaldehyde scavenger is used, it is added in such an amount that the polyoxymethylene copolymer (cPOM) comprises from 0.001 to 10% by weight, preferred from 0.002 to 5% by weight, more preferred from 0.005 to 3% by weight formaldehyde scavenger(s) based on the total weight of polyoxymethylene copolymer (cPOM).

Suitable polyamides are for example copolyamides based on caprolactam, hexamethylenediamine, bis(4-aminocyclohexyl)methane and adipic acid, which can further comprise monofunctional polymerizing compounds such as propionic acid or triacetonediamine as components to regulate the molar mass. Examples are Ultramid® 1C and Ultramid® C31 from BASF SE. In case a polyamide is used, it is added in such an amount that the polyoxymethylene copolymer (cPOM) comprises from 0.001 to 2% by weight, preferably from 0.005 to 1.99% by weight, more preferably from 0.01 to 0.08% by weight of polyamide(s) based on the total weight of polyoxymethylene copolymer (cPOM).

Suitable UV absorbants are for example hindered amines light stabilizer such as a hindered amine of the polymeric structure, wherein n is an integer in the range of 5 to 50,

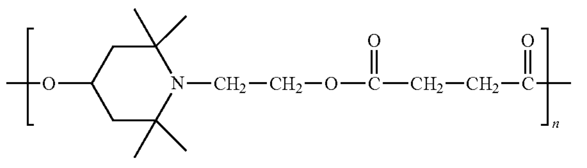

In case a hindered amine is used, it is added in such an amount that the polyoxymethylene copolymer (cPOM) comprises from 0.001 to 10% by weight, preferred from 0.002 to 5% by weight, more preferred it may be of from 0.005 to 2% by weight of hindered amine(s) based on the total weight of polyoxymethylene copolymer (cPOM).

Suitable mold-release agents are for example esters or amides of saturated or unsaturated aliphatic carboxylic acids having from 10 to 40 carbon atoms, preferably from 16 to 22 carbon atoms, with polyols or aliphatic saturated alcohols or amines having from 2 to 40 carbon atoms, preferably from 2 to 6 carbon atoms. In case an ester or amide is used, it is added in such an amount that the polyoxymethylene copolymer (cPOM) comprises from 0.01 to 5% by weight, preferably from 0.09 to 2% by weight and in particular from 0.1 to 0.7% by weight mold-release agents, based on the total weight of polyoxymethylene copolymer (cPOM). Preferred esters or amides are accordingly glyceryl distearate, glyceryl tristearate, ethylenediamine distearate, glyceryl monopalmitate, glyceryl trilaurate, glyceryl monobehenate and pentaerythrityl tetrastearate.

Suitable acid scavengers are, for example, alkaline or earth alkaline carbonates, hydroxides, (hydroxy) stearates or silicates. In case an acid scavenger is used, it is added in such an amount that the polyoxymethylene copolymer (cPOM) comprises from 0.001 to 2% by weight, preferably from 0.002 to 1% by weight, and particularly from 0.003 to 0.7% by weight acid scavengers, based on the total weight of the polyoxymethylene copolymer (cPOM).

Suitable nucleation agents are, for example, melamine cyanurate, melamine formaldehyde condensate, silica acid, branched polyoxymethylene and talcum. In case a nucleation agent is used, it is added in such an amount that that the polyoxymethylene copolymer (cPOM) comprises from 0.005 to 5% by weight, preferably from 0.01 to 2% by weight, and particularly from 0.02 to 0.7% by weight nucleation agents, based on the total weight of the polyoxymethylene co-polymer (cPOM).

If present the additives are added in a customary manner, for example individually or together, in pure form, as a solution or suspension or as a masterbatch.

Another object of the present invention is a polymer molding composition (PM) comprising a polyoxymethylene copolymer (cPOM) and 50 to 700 ppm of the deactivated complex of the catalyst and triisopropanolamine, based on the total weight of the polymer molding composition (PM).

The polymer molding composition (PM) obtained by the method for the production of a polymer molding composition (PM) preferably contains 60 to 99.9% by weight of a polyoxymethylene copolymer (cPOM), 50 to 700 ppm of the complex of the acid catalyst and the triisopropanolamine and optionally 0 to 39.99% by weight of at least one additive selected from the group consisting of antioxidants, formaldehyde scavengers, UV-absorbents, mold-release agents, acid scavengers and nucleation agents.

Another object of the present invention is the use of the polymer molding composition (PM) for the production of molded parts.

The present invention is described in more detail by the examples hereinafter without being restricted thereto.

EXAMPLES a. Analytical Methods

Weight loss $N_2$ (determination of the weight loss under nitrogen atmosphere):

For testing the heat stability, the weight loss at 220° C. under $N_2$ is determined. It is the weight loss in percent of a weighed sample of about 1.2 g of pellets on heating for 2 h at 220° C. under nitrogen. After cooling, the sample is weighed again and the weight loss is calculated.

MVR (DIN EN ISO 1133-1:2012-03):

The melt volume-flow rate (MVR) is determined by extruding molten material from the cylinder of a plastometer through a die of specified length and diameter under preset conditions of temperature (190° C.) and load (2.16 kg).

Extractable Formaldehyde (FA) Content:

The extractable FA content in cPOM granulate is determined as follows. 50 g cPOM granulate and 70 ml water are filled into an Erlenmeyer flask and stirred under reflux for 50 or 100 min. After rapid cooling, the FA content is determined on a Metrohm Titroprozessor 682. Therefore, the pH value is adjusted to pH 9.4 using n/10 sodium hydroxide solution (5 ml) and subsequently, if necessary, n/10 sulfuric acid. Subsequently 5 ml of sodium sulfite solution (136 g $Na_2SO_3$ dissolved in 1 kg deionized water) are added. After the reaction between $Na_2SO_3$ and FA the solution is back-titrated to pH 9.4 using n/10 sulfuric acid.

The Calculation of the FA content is carried out as follows:

mass FA [mg]=consumption $H_2SO_4$×2× concentration $H_2SO_4$×mass formaldehyde

FA content [%]=mass FA [mg]/net weight [g, cPOM granulate]×(1 000 000/1 000)×means multiplying operator It is assumed, that the reaction follows the reaction scheme shown hereinafter

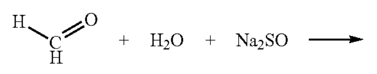

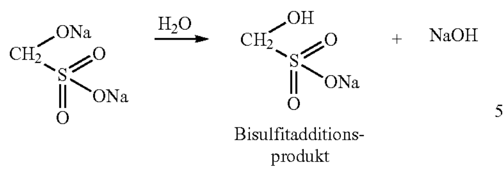

Bisulfitadditions-produkt

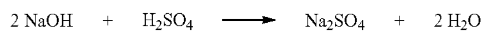

Formaldehyde Emission (VDA 275, 1994 Edition, Jul. 1, 1994):

The manufacture of specimen (test sample) was carried out as follows: In an injection molding machine the cPOM granulate is formed into injection molded plates (40×100×2.5 mm), an injection molding machine is utilized with the following parameters; mass temperature: 200° C., tool wall temperature: 90° C. The test samples are stored before examination in a PE-bag.

For the determination, the specimens are fixed over distilled water in a sealed (closed) 1-L polyethylene bottle at constant temperature (60° C.) for a defined time. Afterwards the 1-L polyethylene bottle is cooled and the formaldehyde content in the distilled water is determined as follows. A photometric analysis using the so-called acetylaceton method is applied. Therefore, the formaldehyde is converted to diacetyldihydrolutidine using acetylacetone und ammonium acetate. The concentration of the diacetyldihydrolutidine is measured photometrically (the maximum of absorption of diacetyldihydrolutidine is at 412 nm).

The formaldehyde content is given relative to the dry weight of the specimen (mg/kg=ppm).

Tensile Test (DIN EN ISO 527-2, Juni 2012):

Tensile bars were injection molded in an injection molding machine at a melt temperature of 200° C. and a mold temperature of 90° C. The tensile test was conducted according to DIN EN ISO 527-2. Mean values of the tensile modulus, the tensile stress at yield, the tensile stress at break, the elongation at yield, the elongation at break and the nominal elongation at break were obtained from ten tensile bars. Exclusively specimens of type 1A were used for all tensile test measurements Hydrolysis Resistance (100° C.):

Tensile testing after high-temperature storage of testing bars in water at 100° C. was measured according to ISO 527. Mean values were obtained from three tensile bars at each time.

Heat Ageing Tensile Test (140° C.):

Tensile testing after high-temperature storage of testing bars in air at 140° C. was measured according to ISO 527. Mean values were obtained from three tensile bars at each time.

Charpy Test (DIN EN ISO 179-1, November 2010):

Charpy bars (80×10×4 $mm^3$) were injection molded in an injection molding machine at a melt temperature of 200° C. and a mold temperature of 90° C. The Charpy test was carried out according to DIN EN ISO 179-1. The Charpy impact strength values were obtained from ten Charpy bars.

Color of Pellets (DIN EN ISO 11664-4, June 2012):

The color differences ΔE were determined against a polyoxymethylene standard (L=90,4; a=−1,24 and b=0,54) using the CIELAB formula according to ISO 116644-4. The measurement was performed with CIE standard illuminant D65 and using observing fields of 10° angular subtense.

Total Carbon Emission (TCE Relating to VDA277, 1995 Edition, Jan. 1, 1995):

The total carbon emission was determined relating to VDA277. An injection molded sheet (60×60×1 mm) was crushed and a weighed quantity (1 g) was stored in a glass vessel (10 ml) for 5 h at 120° C. under air at a pressure of 1013,25-mbar. Subsequently, a defined amount of gas from the vessel was analyzed by headspace GC. The total carbon emission is determined as μg carbon per gram sample.

Specific Migration of Triethanolamine (DIN-EN-1186-3, July 2002):

The manufacture of the specimens (test samples) is carried out as follows: In an injection molding machine the cPOM granulate is formed into injection molded plates (60×60×2 mm), an injection molding machine is utilized with the following parameters; mass temperature: 200° C., tool wall temperature: 90° C. The test samples are stored before examination in a PE-bag.

The specific migration of triethanolamine (TEOA) is determined by Fraunhofer IVV (Fraunhofer-Institut für Verfahrenstechnik und Verpackung), 85354 Freising according to the European Norm EN 1186-3 with the following conditions:

Food simulant: 50% ethanol

Contact time and contact temperature: 2 h/reflux (3 repeated contacts)

Contact surface/volume: 0.56 $dm^2$/50 ml

The amount of migrated triethanolamine was quantified in the third contact with the simulant by using Fraunhofer IVV method 1.4069. The migration solution was diluted by 1/10 and analyzed by LC-MS with a mixture of ammonium acetate and ethanol as flow agent. For detection, the molecular mass was selected in the positive single reaction monitoring mode and the characteristic daughter ion was detected.

Quantification was performed by external calibration. The detection limit of triethanolamine within this method is 0.13 mg/kg.

Specific Migration of Triisopropanolamine (DIN-EN-1186-3, July 2002):

Manufacture of specimen (test sample): In an injection molding machine the POM granules are formed into injection molded plates (60×60×2 mm), an injection molding machine is utilized with the following parameters; mass temperature: 200° C., tool wall temperature: 90° C. The test samples are stored before examination in a PE-bag.

The specific migration of triethanolamine was determined by Fraunhofer IVV (Fraunhofer-Institut für Verfahrenstechnik und Verpackung), 85354 Freising according to the European Norm EN 1186-3 with the following conditions:

Food simulant: 50% ethanol

Contact time and contact temperature: 2 h/reflux (3 repeated contacts)

Contact surface/volume: 0.56 dm2/50 ml

The amount of migrated triisopropanolamine (TIPOA) was quantified in the third contact with the simulant by using Fraunhofer IVV method 1.378. The migration solution was diluted by 1/10 and analyzed by LC-MS with a mixture of formic acid and methanol as flow agent. Quantification was performed by external calibration. The detection limit of triisopropanolamine within this method is 0.005 mg/kg.

Extractable Total Organic Carbon (TOC)/FA Content in Drinking Water according to KTW-Guideline (version 7 Mar. 2016)=the Guideline for Hygienic Assessment of Organic Materials in Contact with Drinking Water, notified to the European Commission under no. 2013/470/D, pursuant to Directive 98/34/EEC. The KTW-Guideline contains test protocols and safety requirements for plastics and silicones that come into contact with drinking water. The extraction and analysis was performed by Hygiene-Institut des Ruhrgebiets, Germany.

The manufacture of the specimens (test samples) is carried out as follows: In an injection molding machine the cPOM granulate is formed into injection molded plates (100 mm×70 mm×2.5 mm), an injection molding machine is utilized with the following parameters; mass temperature: 200° C., tool wall temperature: 90° C. The test samples are stored before examination in a PE-bag.

The migration tests were carried out at 85° C. (hot-water) according to annex 3 of KTW-Guidelines. The surface/volume ratio was 5 dm-1.

The migration water samples were analyzed with the parameters for fittings for pipes with DN≥300 mm (conversion factor=1 d/dm).

The amount of extractable Total Organic Carbon (TOC) was analyzed according DIN EN 1484.

The amount of extractable formaldehyde (FA) on drinking water was determined as follows. 20 ml of migration solution were filled into a flask and 2 ml of a pararosaniline-solution was added (preparation of pararosaniline solution: 160 mg paraosaniline was solved in 24.0 ml conc. hydrochloric acid and dest. water was filled up to 100 ml). Additionally, 2 ml of a freshly prepared sodium sulfite solution was added (preparation of sodium sulfite solution: 50 mg of sodium sulfite was solved in 50 ml dest. water). The flask was filled up to 25 ml with dest. water, sealed and the flask was shaken manually. The flask was stored for 90 min at 23° C. Within this time the formaldehyde is converted with sodium sulfite and pararosaniline into a red-violet color complex. The concentration of this color complex was measured photometrically (the maximum of absorption of the color complex is at a wavelength of 578 nm).

Residual Content of Deactivator in Polymer

The manufacture of the specimen (test samples) is carried out as follows: In an injection molding machine the cPOM granulate is formed into injection molded plates (60 mm×60 mm×2 mm), an injection molding machine is utilized with the following parameters; mass temperature: 200° C., tool wall temperature: 90° C. The test samples are stored before examination in a PE-bag.

The specimens were crushed and about 300 mg of polymer was solved in 5 ml 1,1,1,3,3,3-hexfluoro-2-propanol. Subsequently the flask was filled up with a mixture of water and 1 molar HCl (ratio 100/1) to 10 ml total volume and the mixture was stirred to precipitate the polymer. Afterwards about 30 mg methylamine-HCl was added as internal standard for the measurement. The mixture was filtered (pore width 0.45 μm) and the solution was analyzed with electrophoresis to determine the concentration of TIPOA or TEOA relative to the internal standard. Electrophoresis was performed with 5 mmolar 4-aminopyridine (in $H_2SO_4$, pH 3,4) as electrolyte at the cathode, +25 kV voltage, 16 μA amperage, temperature 20° C.

b. Materials

The following components were used:

(1) Raw cPOM

Raw cPOM is taken from a kneader reactor of a polyoxymethylene copolymer production. For the production of the raw cPOM 96.5% by weight of trioxane and 3.5% by weight of dioxolane is used, based on the total amount of the used monomers. The raw cPOM contains beside cPOM, 85 ppm $BF_3xOEt_2$, 3% by weight of unconverted trioxane and 5% by weight of thermally unstable endgroups, based on the total weight of raw cPOM.

(2) Used Amines for the Deactivation:

Triethanolamine: technical grade, assay min. 99% by GC, by BASF SE

Triisopropanolamine: technical grade, assay min. 99% by GC, by BASF SE (3) Additives:

Irganox 245 FF/Ethylenebis(oxyethylene)bis-(3-(5-tert-butyl-4-hydroxy-m-tolyl)-propionate) (36443-68-2): Irganox 245 FF by BASF SE Synthetic magnesium silicate (1343-88-0)

Talc (14807-96-6): Hydrous magnesium silicate

EBS/N,N'-Ethylenedi (stearamide) (110-30-5)

PA dicapped: PA6,66-copolymer by BASF SE (molecular weight of 3000, prepared from caprolactam, hexamethylenediamine, adipic acid and propionic acid)

Amorphous 6I/6T-polyamide (25750-23-6) (copolyamide prepared from 1,3-benzenedicarboxylic acid, 1,4-benzenedicarboxylic acid and 1,6-hexanediamine)

Tg=125-130° C.

VZ=81-85 ml/g (in H2SO4)

COOH end groups: 88-135 mmol/kg

NH2 end groups: 40-42 mmol/kg $Ca(OH)_2$/Calcium hydroxide (1305-62-0)

Glyceryl distearate (68308-54-3)

c. Preparation of the Materials (1) Production of cPOM Resins with Different Deactivators (Pilot Scale Test):

The specific amine (triisopropanolamine or triethanolamine) was diluted with 20 g water to facilitate homogenous distribution on raw cPOM (the amount of amine in the finished cPOM is shown in table 1). This deactivation solution was added to 10 ka of raw cPOM. The resulting mixture was held for 30 min. Afterwards 62 a of an additive mixture was added for further stabilization (the concentrations of the additives in the final product were: 0.35% Irganox 245 FF, 0.05% synthetic magnesium silicate (1343-88-0), 0.15% Glyceryl distearate, 0.04% PA dicapped and 0.05% Talc). Afterwards the mixture was extruded in a twin-screw extruder (TEX-30, L/D=40, ϕ=27 mm) with 25 kg/h and 250 rpm. The temperature of the melt was 200° C. at the output. The resulting granules were dried at 120° C. for 6 h to obtain the finished cPOM.

cPOMs with the following amines and concentrations were tested:

TABLE 1

| | Triisopropanolamine (TIPOA) | Triethanolamine (TEOA) |
|---|---|---|
| Example 1 | 3.4 g (344 ppm in final product; cPOM) | |
| Example 2 | 5.7 g (573 ppm in final product; cPOM) | |
| Example 3 | 8.0 (802 ppm in final product; cPOM) | |
| Comparison 1 | | 2.7 g (268 ppm in final product; cPom) |
| Comparison 2 | | 4.5 g (447 ppm in final product; cPOM) |
| Comparison 3 | | 6.3 g (625 ppm in final product; cPOM) |

d. Results

TABLE 2

| | Example 1 344 ppm TIPOA | Example 2 573 ppm TIPOA | Example 3 802 ppm TIPOA | Compar 1 268 ppm TEOA | Compar 2 447 ppm TEOA | Compar 3 625 ppm TEOA |
|---|---|---|---|---|---|---|
| Weight loss $N_2$ (%) | 1.78 | n.d. | 2.43 | 1.84 | 1.92 | 3.01 |
| MVR (cm3/10') | 10.4 | 12.2 | 12.7 | 10.7 | 10.6 | 11.4 |
| Extractable FA content ($H_2O$, 100° C., 50 min) (ppm) | 270.0 | 302.0 | 310.0 | 252.0 | 390.0 | 776.0 |
| FA emission (ppm) | 110 | n.d. | n.d. | 142 | n.d. | n.d. |
| dE | 1.7 | 1.8 | 1.4 | 1.8 | 3.3 | 2.5 |
| dL | −1.6 | −1.7 | −1.2 | −1.7 | −2.3 | −2.2 |
| da | 0.4 | 0.4 | 0.3 | 0.4 | 0.5 | 0.4 |
| db | 0.5 | 0.7 | 0.6 | 0.5 | 2.2 | 0.9 |
| L* | 88.8 | 88.7 | 89.2 | 88.7 | 88.1 | 88.2 |
| a* | −0.9 | −0.9 | −0.9 | −0.9 | −0.8 | −0.9 |
| b* | 1.0 | 1.2 | 1.2 | 1.1 | 2.8 | 1.5 |
| Tensile modulus (MPa) | 2678 | n.d. | n.d. | 2745 | n.d. | n.d. |
| Tensile stress at yield (MPa) | 64 | n.d. | n.d. | 64 | n.d. | n.d. |
| Tensile stress at break (MPa) | 55 | n.d. | n.d. | 55 | n.d. | n.d. |
| Elongation at yield (%) | 9.2 | n.d. | n.d. | 9.1 | n.d. | n.d. |
| Elongation at break (%) | n.d. | n.d. | n.d. | n.d. | n.d. | n.d. |
| Nom. elongation at break (%) | 30.2 | n.d. | n.d. | 29.0 | n.d. | n.d. |
| Charpy impact strength +23° C. ($kJ/m^2$) | 207 | n.d. | n.d. | 200 | n.d. | n.d. |
| Charpy notched impact strength +23° C. ($kJ/m^2$) | 6.4 | n.d. | n.d. | 6.1 | n.d. | n.d. |

The results in table 2 show that the use of triisopropanolamine (TIPOA) for the deactivation of the catalyst leads to a lower FA content and a lower FA emission compared to the deactivator triethanoleamine (TEOA) which is used in the state of the art. Moreover, the use of TIPOA has no negative influence on the color and the physical properties of cPOM.

TABLE 3

Results for the hydrolysis resistance at 100° C.

| | Example 1 344 ppm TIPOA | | | Comparison 1 268 ppm TEOA | | |
|---|---|---|---|---|---|---|
| | Tensile modulus (MPa) | Tensile stress at yield (MPa) | Nom. elongation at break (%) | Tensile modulus (MPa) | Tensile stress at yield (MPa) | Nom. elongation at break (%) |
| 0 | 2678 | 63.65 | 30.21 | 2745 | 64.31 | 29.04 |
| 7 d | 2053 | 64.59 | 28.45 | 2040 | 64.64 | 23.33 |
| 14 d | 2181 | 65.88 | 26.97 | 2197 | 66 | 20.93 |
| 21 d | 2086 | 64.54 | 23.71 | 2069 | 64.55 | 21.14 |
| 42 d | 2130 | 64.67 | 18.54 | 2136 | 64.78 | 16.39 |
| 49 d | 2089 | 64.33 | 22.76 | 2041 | 64.15 | 15.35 |
| 56 d | 2001 | 64.47 | 22.01 | 1994 | 64.51 | 16.12 |

TABLE 4

Results for the heat ageing tensile test

| | Example 1 344 ppm TIPOA | | | Comparison 1 268 ppm TEOA | | |
|---|---|---|---|---|---|---|
| | Tensile modulus (MPa) | Tensile stress at yield (MPa) | Nom. elongation at break (%) | Tensile modulus (MPa) | Tensile stress at yield (MPa) | Nom. elongation at break (%) |
| 0 | 2678 | 63.65 | 30.21 | 2745 | 64.31 | 29.04 |
| 500 h | 2913 | 67.56 | 25.29 | 2935 | 67.79 | 20.02 |
| 750 h | 3065 | 67.19 | 19.038 | 3042 | 66.18 | 17.97 |
| 1000 h | 2875 | 58.93 | 5.93 | 2869 | 55.81 | 4.71 |

The results in tables 3 and 4 prove that TIPOA leads to cPOM with improved hydrolysis and heat aging performance compared to TEOA.

(2) Production of cPOM Resins with Different Deactivators (Industrial Scale Test):

Raw cPOM was produced using 85 ppm $BF_3$*$OEt_2$ in a kneader-based process.

Dioxolane to trioxane ratio used was 3,5:96,5 and methylal was adjusted to produce medium viscosity cPOM with an output of 1750 kg/h.

The amine used in the trials was dosed as 6 wt % solution in ethyl acetate and sprayed on the crushed cPOM.

The removal of the residual monomers and the instable endgroups was done on a twin screw extruder at 230° C./135 rpm.

Additives (concentration in the finished PM): 0.35% Irganox 245 FF, 0.05% synthetic magnesium silicate (1343-88-0), 0.05% Talc, 0.04% amorphous 6I/6T polyamide (25750-23-6), 0.15% EBS, 0.02% $Ca(OH)_2$ The following amines and concentrations were tested (table 5):

TABLE 5

| | triethanolamine | triisopropanolamine |
|---|---|---|
| Comparison 4 | 270 ppm in final product; cPOM | |
| Example 4 | | 400 ppm in final product; cPOM |

e. Results

TABLE 6

| | Comparison 4 | Example 4 |
|---|---|---|
| MVR (190° C., 2.16 kg, 5') pellets | 8.7 | 9.0 |
| Gewichtsverlust unter N2 (222° C., 5 h) | 0.27% | 0.13% |
| Extractable FA content (H2O, 100° C., 50 min) (ppm) | 194 ppm | 185 ppm |
| Extractable FA content (H2O, 100° C., 100 min) (ppm) | 490 ppm | 382 ppm |
| FA emission (VDA275) | 10 ppm | 6 ppm |
| TCE (VDA277) | 6 ppm | 5 ppm |
| Specific migration of deactivation agent (acc. DIN-EN-1186-3) | 0.65 ppm TEOA | 0.32 ppm TIPOA |
| Extractable Total Organic Carbon | 1.60 mg/dm2xd | 1.19 mg/dm2xd |
| (TOC)/FA content in drinking water acc. KTW Guidelines | 15000 μg/L | 13000 μg/L |
| Residual content of deactivator in polymer | 59 ppm TEOA | 22 ppm TIPOA |
| Tensile modulus (MPa) | 2793 | 2707 |
| Tensile stress at yield (MPa) | 64 | 64 |
| Tensile stress at break (MPa) | 59 | 59 |
| Elongation at yield (%) | 9.9 | 10.3 |
| Elongation at break (%) | | |
| Nom. elongation at break (%) | 25.4 | 26.4 |
| Charpy impact strength +23° C. ($kJ/m^2$) | 180 | 212 |
| Charpy notched impact strength +23° C. ($kJ/m^2$) | 6.2 | 6.8 |

TABLE 7

Results for hydrolysis resistance at 100° C.

| | Comparison 4 | | | Example 4 | | |
|---|---|---|---|---|---|---|
| | Tensile modulus (MPa) | Tensile stress at yield (MPa) | Nom. elongation at break (%) | Tensile modulus (MPa) | Tensile stress at yield (MPa) | Nom. elongation at break (%) |
| 0 d | 2793 | 64.45 | 25.44 | 2707 | 63.9 | 26.36 |
| 7 d | 2106 | 64.7 | 14.24 | 2104 | 64.49 | 17.92 |
| 14 d | 2011 | 62.32 | 9.28 | 2012 | 62.85 | 11.52 |
| 28 d | 2042 | 58.98 | 7.01 | 2031 | 59.8 | 7.64 |
| 56 d | 2079 | 52.01 | 5.24 | 2063 | 57.34 | 6.59 |

TABLE 8

| Results for heat ageing tensile test at 140° C. | Comparison 4 | | | Example 4 | | |
|---|---|---|---|---|---|---|
| | Tensile modulus (MPa) | Tensile stress at yield (MPa) | Nom. elongation at break (%) | Tensile modulus (MPa) | Tensile stress at yield (MPa) | Nom. elongation at break (%) |
| 0 h | 2793 | 64.45 | 25.44 | 2707 | 63.9 | 26.36 |
| 500 h | 2882 | 67.52 | 20.09 | 2894 | 66.38 | 21.7 |
| 750 h | 2770 | 66.49 | 15.47 | 2713 | 66.2 | 18.36 |
| 1000 h | 2986 | 66.28 | 14.41 | 2926 | 66.49 | 16.66 |

The invention claimed is:

1. A method for the deactivation of an acid catalyst during the production process of a polyoxymethylene copolymer (cPOM), wherein the method for the deactivation of the acid catalyst comprises the steps:

a) providing a first mixture (M1) comprising the polyoxymethylene copolymer (cPOM) and the acid catalyst, b) adding triisopropanolamine to the first mixture (M1) to deactivate the acid catalyst in order to obtain a second mixture (M2) comprising the polyoxymethylene copolymer (cPOM) and a complex of the acid catalyst and triisopropanolamine, wherein the triisopropanolamine in step b) is added in a molar excess in view of the acid catalyst from 25:1 to 1:1.

2. The method according to claim 1, wherein the polyoxymethylene copolymer (cPOM) comprises from 60 to 99.99 mol % of $—CH_2O—$ recurring units and from 0.01 to 40 mol % of recurring units according to formula (I)

(I)

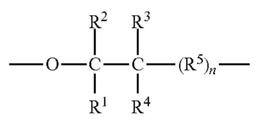

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a chemical bond, a $—CH_2—$, $—OCH_2—$, a $C_1$-$C_4$-alkyl- or $C_1$-$C_4$-alkoxy-substituted methylene group or a corresponding oxymethylene group and n is from 0 to 3.

3. The method according to claim 2, wherein step a) comprises the step:

a1) polymerization of at least one main monomer selected from the group of cyclic formals, and at least one first comonomer selected from the group of those of the formula (II)

(II)

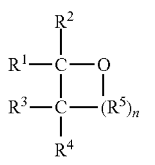

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a chemical bond, a $—CH_2—$, $—OCH_2—$, a $C_1$-$C_4$-alkyl- or $C_1$-$C_4$-alkoxy-substituted methylene group or a corresponding oxymethylene group and n is from 0 to 3, and optionally at least one second comonomer, in the presence of the acid catalyst, in order to provide the first mixture (M1) comprising the polyoxymethylene copolymer (cPOM) and the acid catalyst.

4. The method according to claim 3, wherein the acid catalyst in step a1) is present in an amount of from 10 to 150 ppm based on the total weight of main monomers and the comonomers.

5. The method according to claim 1, wherein the acid catalyst is at least one acid catalyst selected from the group consisting of boron trifluoride, a coordination complex of boron trifluoride with water, a coordination complex of boron trifluoride with a dialkylether and catalytic active transformation product of the aforementioned acid catalyst.

6. The method according to claim 1, wherein the acid catalyst in step a) is present in an amount of from 10 to 150 ppm based on the total weight of the first mixture (M1).

7. The method according to claim 1, wherein in step b) the triisopropanolamine is added in form of a solution comprising the triisopropanolamine dissolved in at least one solvent.

8. The method according to claim 7, wherein the solution comprises ethylacetate as a solvent.

9. A method for the production of a polymer molding composition (PM) comprising the steps:

a1) polymerization of at least one main monomer selected from the group of cyclic formals, and at least one first comonomer selected from the group of those of the formula (II)

(II)

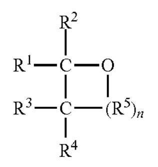

where $R^1$ to $R^4$ are each, independently of one another, a hydrogen atom, a $C_1$-$C_4$-alkyl group or a alkoxy-substituted alkyl group having from 1 to 4 carbon atoms and $R^5$ is a chemical bond, a $—CH_2—$, $—OCH_2—$, a $C_1$-$C_4$-alkyl- or $C_1$-$C_4$-alkoxy-substituted methylene group or a corresponding oxymethylene group and n is from 0 to 3, and optionally at least one second comonomer, in the presence of the acid catalyst, in order to provide the first mixture (M1) comprising the polyoxymethylene copolymer (cPOM) and the acid catalyst, b) adding triisopropanolamine to the first mixture (M1) to deactivate the acid catalyst in order to obtain a second mixture (M2) comprising the polyoxymethylene copolymer (cPOM) and a complex of the acid catalyst and triisopropanolamine, wherein the triisopropanolamine in step b) is added in a molar excess in view of the acid catalyst from 25:1 to 1:1, c) optionally adding at least one additive to the second mixture (M2).

* * * * *